United States Patent
Sayenko et al.

(10) Patent No.: US 11,375,421 B2
(45) Date of Patent: Jun. 28, 2022

(54) CELL HANDOVER IN A RADIO CELLULAR SYSTEM

(71) Applicant: Apple Inc., Cupertino, CA (US)

(72) Inventors: Alexander Sayenko, Munich (DE); Anatoliy Sergey Ioffe, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 59 days.

(21) Appl. No.: 16/800,887

(22) Filed: Feb. 25, 2020

(65) Prior Publication Data

US 2021/0051546 A1    Feb. 18, 2021

Related U.S. Application Data

(60) Provisional application No. 62/888,073, filed on Aug. 16, 2019.

(51) Int. Cl.
*H04W 36/08* (2009.01)
*H04W 36/00* (2009.01)
(Continued)

(52) U.S. Cl.
CPC .......... *H04W 36/08* (2013.01); *H04L 1/0026* (2013.01); *H04L 5/0051* (2013.01); *H04W 36/0058* (2018.08); *H04W 56/001* (2013.01); *H04W 72/046* (2013.01); *H04W 72/14* (2013.01); *H04W 74/0833* (2013.01); *H04W 76/27* (2018.02)

(58) Field of Classification Search
CPC combination set(s) only.
See application file for complete search history.

(56) References Cited

U.S. PATENT DOCUMENTS

| | | | |
|---|---|---|---|
| 2017/0054479 A1* | 2/2017 | Sang | C07D 413/10 |
| 2017/0215117 A1* | 7/2017 | Kwon | H04B 7/0408 |

(Continued)

FOREIGN PATENT DOCUMENTS

WO    WO-2018174609 A2 *    9/2018    ............ H04L 5/005

OTHER PUBLICATIONS

Simone Barbera, et al., Synchronized RACH-less Handover Solution for LTE Heterogeneous Networks, ResearchGate Conference paper, https://www.researchgate.net/pubiication/278675514, Jun. 2016.

(Continued)

*Primary Examiner* — Yee F Lam
(74) *Attorney, Agent, or Firm* — Fletcher Yoder, P.C.

(57) ABSTRACT

When user equipment (UE) is to be handed over, the network and/or the UE determines a best beam for the UE's interactions with the target cell before the handover is completed. One or more additional next best beams may also be determined. The network (e.g., the target cell) allocates one or more uplink (UL) grants that corresponds to the best beam. Via a current cell, the UE receives the one or more UL grants from the network pertaining to communications between the UE and the target cell. The UE determines whether any beams of the one or more UL grants satisfy beam criteria. The beam criteria may include 1) an allocated beam being the current best beam or 2) an allocated beam being within a strength threshold of the current best beam. If the criteria is not satisfied, the UE initiates another handover type (e.g., a RACH-based handover).

19 Claims, 7 Drawing Sheets

(51) Int. Cl.
    *H04W 74/08*     (2009.01)
    *H04W 72/14*     (2009.01)
    *H04W 72/04*     (2009.01)
    *H04W 56/00*     (2009.01)
    *H04W 76/27*     (2018.01)
    *H04L 5/00*     (2006.01)
    *H04L 1/00*     (2006.01)

(56) References Cited

U.S. PATENT DOCUMENTS

| | | | | |
|---|---|---|---|---|
| 2018/0279181 | A1* | 9/2018 | Hampel | H04W 36/0072 |
| 2018/0331747 | A1* | 11/2018 | Kakishima | H04B 7/0626 |
| 2018/0343043 | A1* | 11/2018 | Hakola | H04B 7/0417 |
| 2019/0297537 | A1* | 9/2019 | Tsai | H04W 72/14 |
| 2019/0297547 | A1* | 9/2019 | Tsai | H04W 24/08 |
| 2019/0387440 | A1* | 12/2019 | Yiu | H04W 36/0072 |
| 2020/0029292 | A1* | 1/2020 | Zou | H04L 1/0009 |
| 2020/0053607 | A1* | 2/2020 | Ingale | H04L 5/005 |
| 2020/0186261 | A1* | 6/2020 | Devarasetty | H04B 7/0626 |
| 2020/0260500 | A1* | 8/2020 | Agiwal | H04W 74/0833 |
| 2020/0296759 | A1* | 9/2020 | Agiwal | H04L 1/1887 |
| 2020/0329405 | A1* | 10/2020 | Awoniyi-Oteri | H04W 36/0027 |
| 2021/0022057 | A1* | 1/2021 | Sabouri-Sichani | H04W 74/02 |

OTHER PUBLICATIONS

Peter Von Butovitsch, et al., Advanced Antenna Systems for 5G Networks, Ericsson white paper, GFMC-18:000530, Nov. 2018.

Nokia et al.; "RACH-less HO in beam-based system"; 3GPP Draft; R2-1909286_Rack-Less HO in Beam-Based System, 3rd Generation Partnership Project (3GPP); Mobile Competence Centre; 650, Route des Lucioles; F-06921 Sophia-Antipolis Cedex, France; vol. RAN WG2, No. Prague, Czechia; Aug. 26, 2019-Aug. 30, 2019; XP051767088; [retrived from the internet: Http://www.3gpp.org/ftp/tsg_ran/WG2_RL2/TSGR2_107/Docs/r2-1909286.zip-retrieved on Aug. 15, 2019].

LG Electronics Inc: "Support of RACH-less Handover in NR", 3GPP Draft; $2-1802542 Support of RACH-Less Handover in NR, 3rd Generation Partnership Project (3GPP), Mobile Competence Centre; 650, Route des Lucioes F-06921 Sophia-Antipolis Cedex, France; vol. RAN WG2, No. Athens, Greece; Feb. 26, 2018-Mar. 2, 2018, Feb. 14, 2018, XP051399253 [retrieved from the Internet—http://www.3gpp.org/ftp/tsg%5Fran/WG2%5FRL2/TSGR2%5F101/DDocs/—retrieved on Feb. 14, 2018].

Qualcomm Incorporated: "RACH-Less HO design considerations", 3GPP Draft; R2-1903649, 3rd Generation Partnership Project (3GPP), Mobile Competence Centre; 650, Route des Lucioles; F-06921 Sophia-Antipolis Cedex, France; vol. RAN WG2, No. Xi'an, China; Apr. 8, 2019-Apr. 12, 2019, Apr. 6, 2019, XP051700991 [retrieved from the internet—http://www.3gpp.org/ftp/Meetings%5F3GPP%5FSYNC/RAN2/Docs/R2%2D1903649%2Ezip—retrieved on Apr. 6, 2019].

Apple: "RACH-less Handover", 3GPP Draft; $2-1909861_RACH-LEss Handover_VO, 3rd Generation Partnership Project (3GPP), Mobile Competence Centre; 650, Route des Lucioles; F-06921 Sophia-Antipolis Cedex, France; vol. RAN WG2 ,Aug. 16, 2019, XP051767652, [retrieved from the internet—http://www.3gpp.org/ftp/tsg_ran/WG2_RL2/TSG$2_107/Docs/R2-1909861.zip—retrieved on Aug. 16, 2019].

Apple Inc.: "Further considerations on the RACH-less handover for NR", 3GPP Draft; R4-1908030 RACH, 3rd Generation Partnership Project (3GPP), Mobile Competence Centre; 650, Route des Lucioles; F-06921 Sophia-Antipolis Cedex, France; vol. RAN WG4, No. Ljubljana, Slovenia; Aug. 26, 2019-Aug. 30, 2019 Aug. 16, 2019, XP051771036 (retrieved from the internet—http://www.3gpp.org/ftp/tsg_ran/WG4_radio/TSGR4_92/Docs?R4-1908030.zip—retrieved on Aug. 16, 2019].

International Search Report and Written Opinion for PCT Application No. PCT/US2020/045826 dated Oct. 19, 2020; 16 pgs.

\* cited by examiner

CELL HANDOVER IN A RADIO CELLULAR SYSTEM

CROSS REFERENCE TO RELATED APPLICATION

This application claims priority from and the benefit of U.S. Provisional Application Ser. No. 62/888,073, entitled "CELL HANDOVER IN A RADIO CELLULAR SYSTEM", filed Aug. 16, 2019, which is hereby incorporated by reference in its entirety for all purposes.

BACKGROUND

The present disclosure relates generally to wireless communication systems and, more specifically, to systems and methods for cell handover in new radio (NR) system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In cellular communication networks, each basestation of a cellular network covers a specific area or cell. When a mobile device moves between cells, communications between the mobile device and the cellular network is handed over from a current cell to a target cell. The change of cells may be attributed to physical movement of the mobile device or other reasons (e.g., the previous cell becomes unavailable/has lower performance and/or is overly congested). The handover may cause temporary interruption of communication between the mobile device and the cellular network.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Cellular communications networks enable handover of user equipment (UE) between a current cell and a target cell. When the UE is to be handed over, the network and/or the UE determines a best beam for the UE's interactions with the target cell before the handover is completed. The network and/or the UE may determine one or more additional next best beams. The network (e.g., the target cell) allocates an uplink (UL) grant that corresponds to the best beam. In some embodiments, the network may allocate additional UL grants that correspond to the one or more additional next best beams.

The UE may measure the target cell before the handover and send a measurement report to the current cell of the network before the handover is completed. Via the current cell, the UE receives one or more UL grants from the network (e.g., current cell) pertaining to communications between the UE and the target cell. After handover, the UE determines a current best beam. The UE determines whether one of the one or more UL grants corresponds to an allocated beam that satisfies beam criteria. The beam criteria may include 1) the allocated beam being the current best beam or 2) the allocated beam being within a strength threshold (e.g., a defined number of decibels) of the current best beam. If the criteria is satisfied, the UE uses the allocated beam for future communication with the target cell. If the criteria is not satisfied, the UE initiates another handover type (e.g., a RACH-based handover).

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
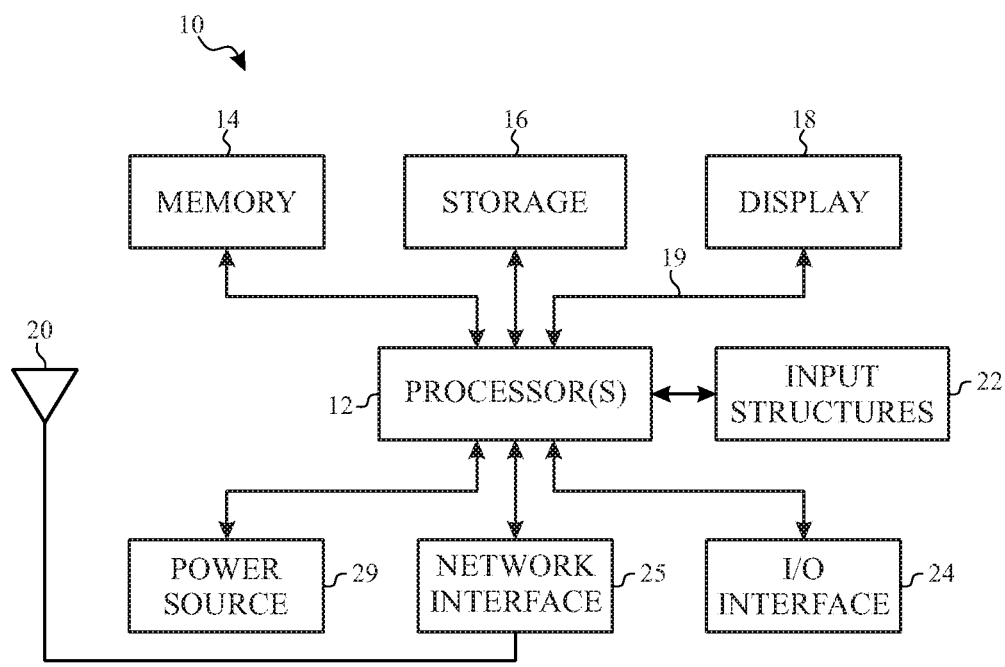
FIG. 1 is a block diagram of an electronic device that includes an antenna, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As previously discussed, handovers of a mobile device between cells of a cellular network may result an interruption of data communication between the cellular network and the mobile device. To perform the handover, a random access channel (RACH) may be used by the cellular network. The RACH is a shared channel used by the mobile device to set-up calls and to establish how the communications are to be performed with the new cell in a handover. To reduce the interruption time, the handovers may utilize a make-before-break procedure (MBB) that establishes a new connection for the mobile device to the target cell before a connection to the current cell is broken. With the use of synchronized base stations, a RACH-less handover may be used to decrease target cell access time to further reduce the period of interruption due to the handover.

As discussed below, the use of a RACH-less handover may create issues in 5G new radio (NR) that utilizes beam management. When using RACH in cellular networks that utilize beam management, the RACH phase may be used to establish beams used in communications using the cellular networks having beam management frameworks. However, when the mobile device skips the RACH phase, the mobile device is pre-allocated an uplink (UL) grant in the target cell to which the mobile device is being handed over. The UL grant is used to enable a data transfer between the mobile device and the target cell. In some embodiments, the UL grant has a set delay period (e.g., 4 ms) between receipt of the UL grant and beginning the data transfer to the target cell. Ideally, the beam corresponding to the UL grant in NR systems is the best beam for the connection between the basestation and the mobile device. However, even though the network and/or the mobile device may determine the best beam, the beam used for the mobile device may not be the best beam for the communications between the basestation and the mobile device after the handover. For example, between the allocation of the UL grant to the mobile device and the establishment of the connection between the mobile device and the basestation of the target cell, a current best may have changed and may be different than the pre-allocated beam. Without the RACH phase, the mobile device is unable to indicate which beam is the best beam to the basestation of the target cell. Without this indication, the target cell's basestation may continue using the originally allocated beam even though the allocated beam is not the best beam.

With the foregoing in mind, there are many suitable electronic devices that may benefit from the embodiments for cellular handovers described herein. Turning first to FIG. 1, an electronic device 10 according to an embodiment of the present disclosure may include, among other things, one or more processor(s) 12, memory 14, nonvolatile storage 16, a display 18, antenna(s) 20, input structures 22, an input/output (I/O) interface 24, and a network interface 25. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
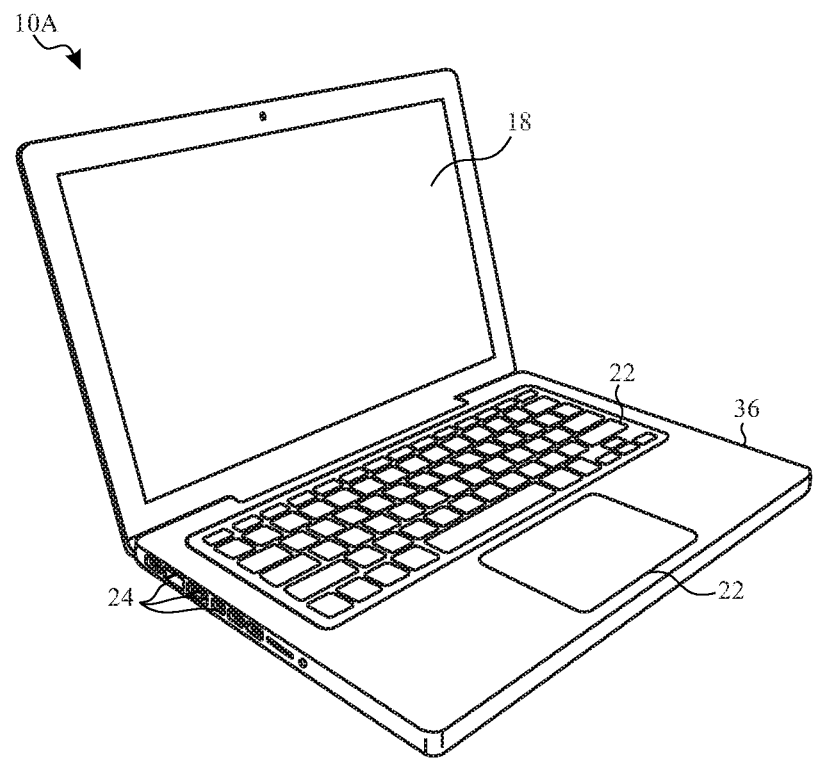
FIG. 2 is a perspective view of a notebook computer representing an embodiment of the electronic device of FIG. 1.
Figure 4:
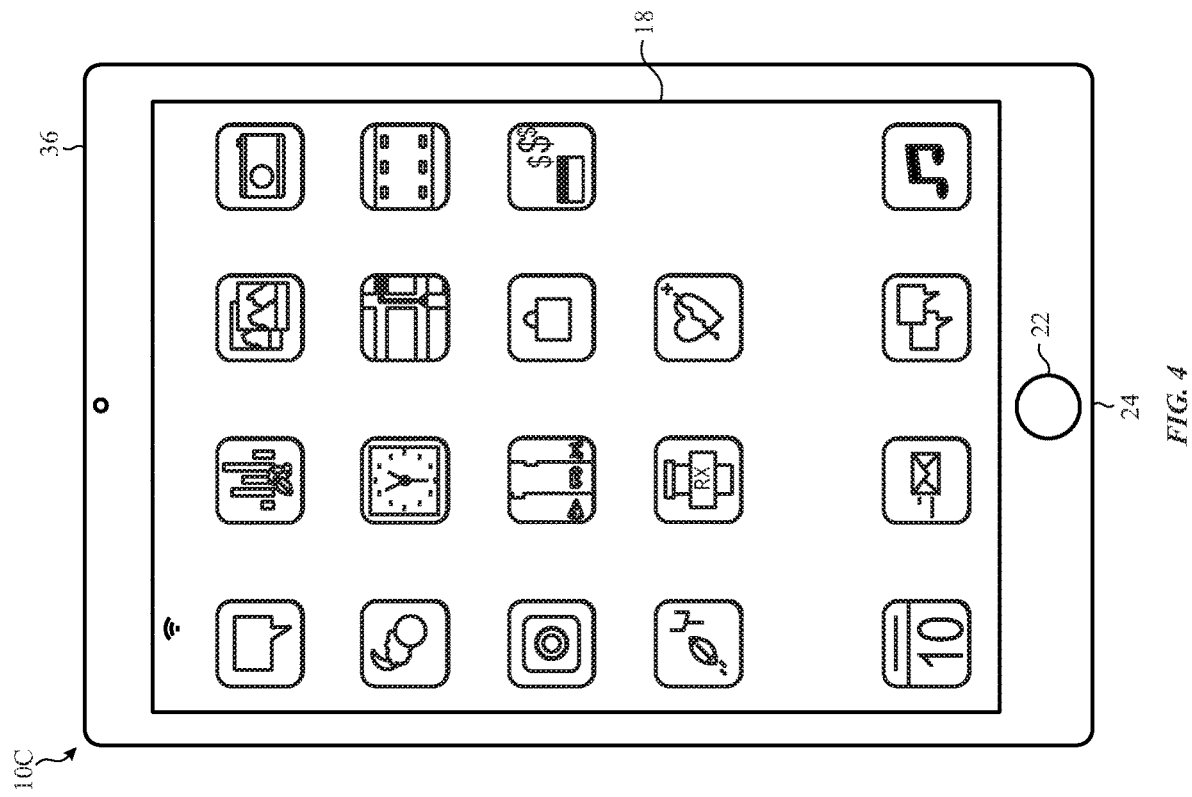
FIG. 4 is a front view of another hand-held device representing another embodiment of the electronic device of FIG. 1.
Figure 3:
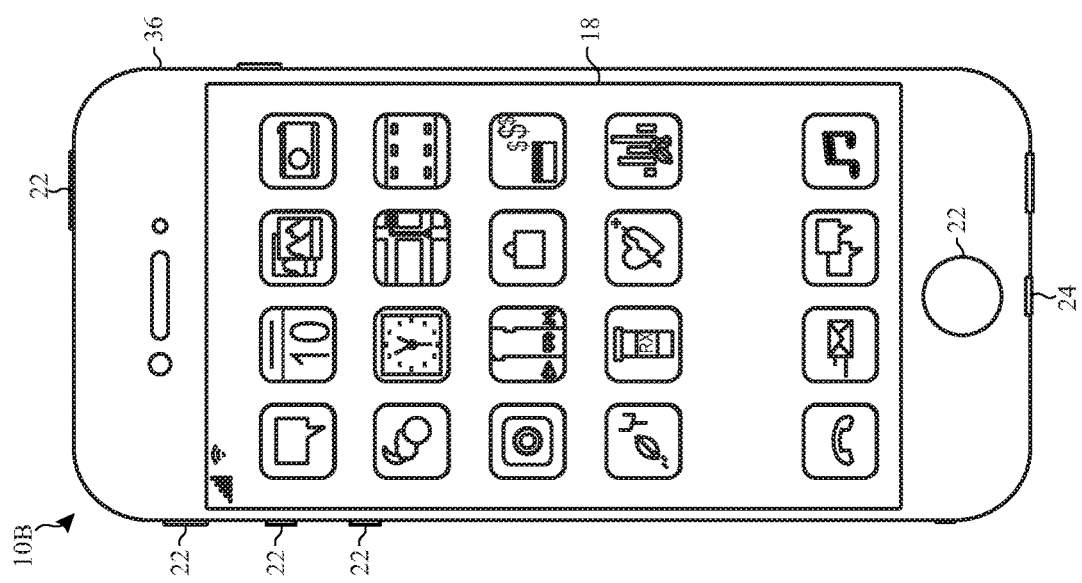
FIG. 3 is a front view of a hand-held device representing another embodiment of the electronic device of FIG. 1.
Figure 5:
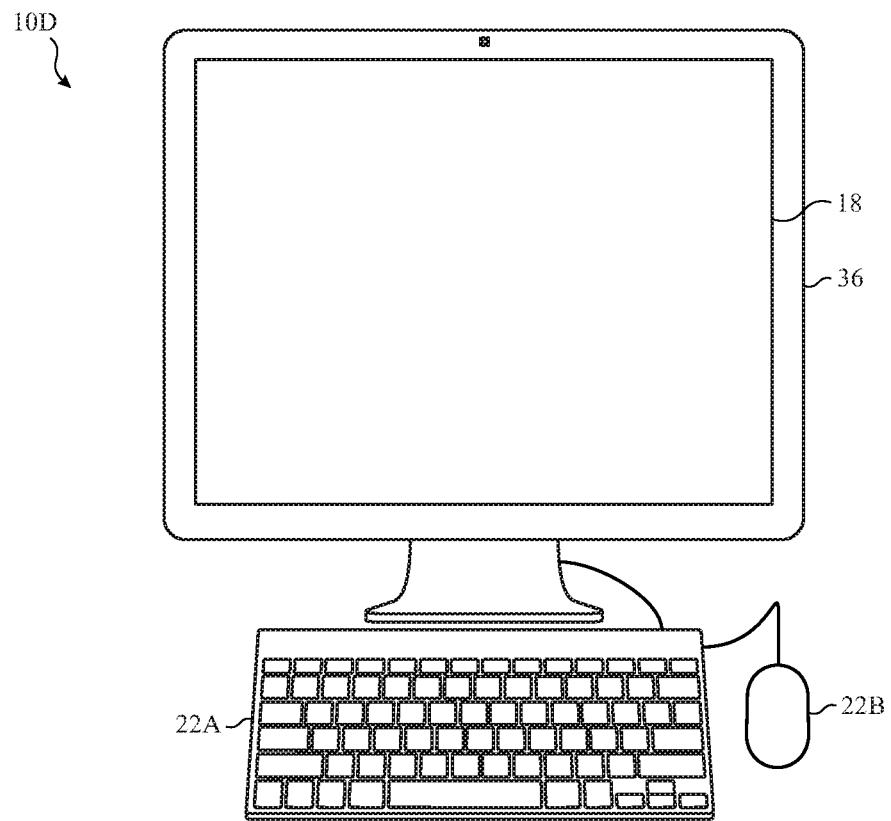
FIG. 5 is a front view of a desktop computer representing another embodiment of the electronic device of FIG. 1.
Figure 6:
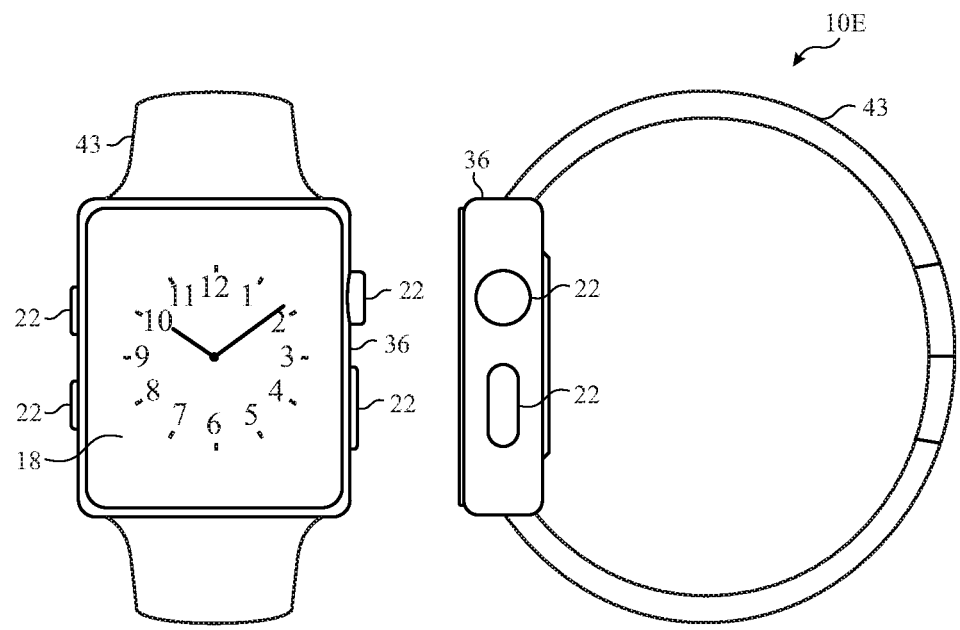
FIG. 6 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 25. The network interface 25 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, universal mobile telecommunication system (UMTS), 4th generation (4G) cellular network, long term evolution (LTE) cellular network, or long term evolution license assisted access (LTE-LAA) cellular network, 5th generation (5G) cellular network, and/or 5G New Radio (5G NR) cellular network. The network interface 25 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth. For example, network interfaces 25 may be capable of joining multiple networks, and may employ one or more antennas 20 to that end.

As further illustrated, the electronic device 10 may include a power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MACBOOK®, MACBOOK® PRO, MACBOOK AIR®, IMAC®, MAC® MINI, OR MAC PRO® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an IPOD® OR IPHONE® available from Apple Inc. of Cupertino, Calif. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc., a universal serial bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an IPAD® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an IMAC®, a MACBOOK®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input structures 22, such as the keyboard 22A or mouse 22B, which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an APPLE WATCH® by Apple Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
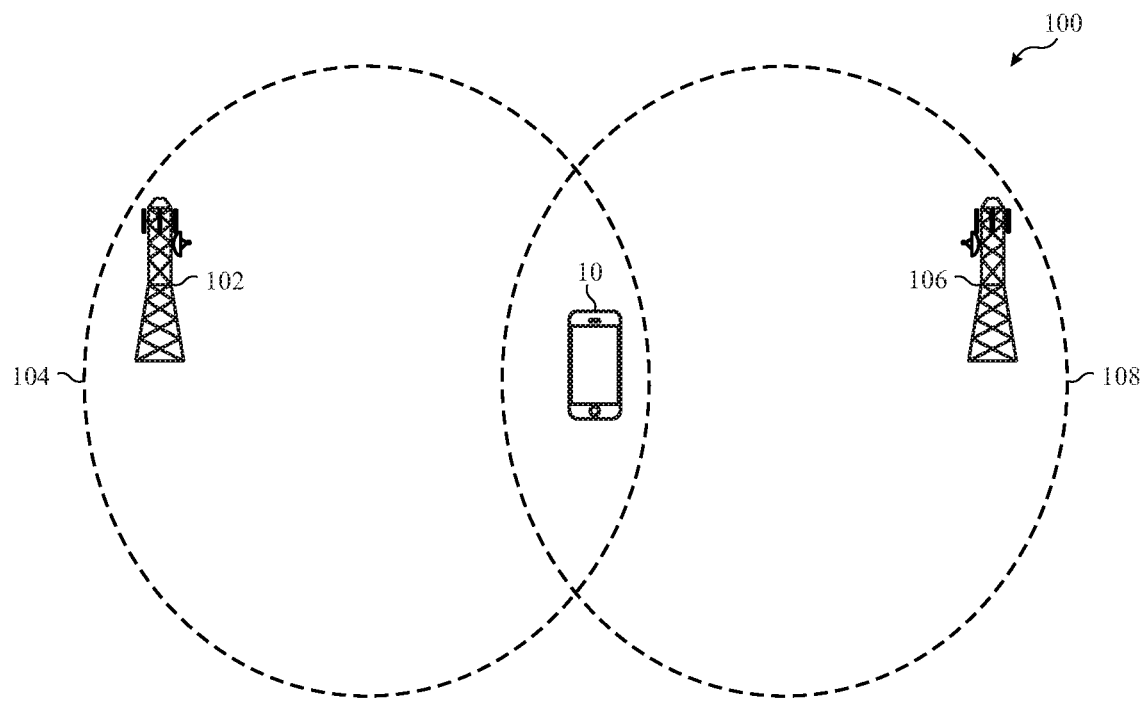
FIG. 7 is a diagram of a cellular network that connects to the electronic device of FIG. 1, in accordance with embodiments of the present disclosure.

With the foregoing in mind, FIG. 7 illustrates an example of cellular communications network 100 to which the electronic device 10 connects. Although the electronic device 10 is illustrated as a cellular phone, the cellular communications network 100 may connect to any electronic device that has a corresponding radio, such as an LTE or 5G radio, as part of its network interface 25 and antenna 20. The cellular communications network 100 includes a basestation 102 that is used to implement at least a portion of a cell 104. Similarly, the cellular communications network 100 includes a basestation 106 that is used to implement at least a portion of a cell 108. The basestations 102 and 106 may include and/or utilize a computing device (e.g., another iteration of the electronic device 10) to perform computations and/or implement program code to perform specific tasks.

At some point, the connection to the basestation 102 becomes less desirable than a connection to the basestation 106. This change may be due to the electronic device 10 exiting the cell 104 or the basestation 102 otherwise becoming congested/unavailable to the electronic device 10. At this point, the electronic device 10 is handed over from the cell 103 to the cell 108. In some embodiments, the handover may utilize a Random Access Channel (RACH) of the basestation 106 to setup the connection between the basestation 106 and the electronic device 10. However, due to the break of the connection between the electronic device 10 and the basestation 102 and establishment of the connection between the electronic device 10 and the basestation 106, the electronic device 10 may undergo a temporary interruption of service due to the handover. To reduce this interruption, a make-before-break (MBB) handover may be made. During an MBB handover, the connection between the basestation 106 and the electronic device 10 may be made before the connection between the basestation 102 and the electronic device 10 may be broken. Furthermore, due to availability of synchronization between the basestations 102 and 106, the setup of the connection between the basestation 106 and the electronic device 10 may be performed without using the RACH in a RACH-less handover. A RACH-less handover further reduces the handover delay and it associated interruption time due to the handover. A RACH-less mechanism (as applied to LTE) includes a pre-allocation of an uplink (UL) grant in the cell 108 since the RACH phase is skipped in the handover. A possible method of performing the pre-allocation includes allocating a fixed grant that are sent to the electronic device 10 via the cell 104 before the handover. An alternative method of performing the pre-allocation may include the cell 108 continuously performing the UL grant by using a user equipment (UE) cell-radio network temporary identifier (C-RNTI) that is typically used to transmit to a specific UE (e.g., the electronic device 10) after RACH when RACH is used.

For LTE and 5G NR Frequency Range 1 (FR1) less than 7 GHz, the previously RACH-less handover mechanism may be suitable for handovers. However, for 5G NR Frequency Range 2 (FR2) having a frequency greater than 7 GHz (e.g., 7-24 GHz) that utilize beam management frameworks, a RACH-less handover mechanism should account for beam management.

Figure 8:
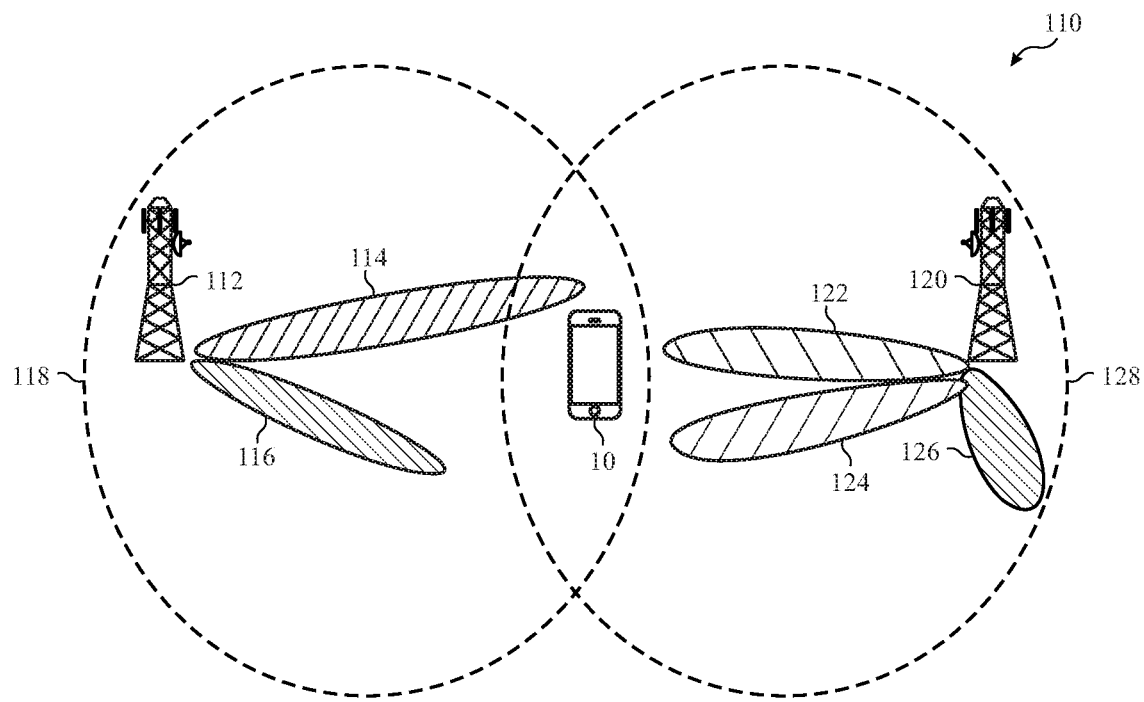
FIG. 8 is a diagram of a cellular network that connects to the electronic device of FIG. 1 using a beam management framework, in accordance with embodiments of the present disclosure.

FIG. 8 illustrates a cellular communications network 110 that utilizes 5G NR FR2. As illustrated, a basestation 112 uses beams 114 and 116 to exchange information with UEs (e.g., electronic device 10) in a cell 118. Similarly, a basestation 120 may use beams 122, 124, and 126 to exchange information with UEs in a cell 128. Although two beams (beams 114 and 116) are illustrated in the cell 118 and three beams (e.g., beams 122, 124, and 126) are illustrated in the cell 128, any suitable number of beams may be deployed within the cells 118 and 128. During a RACH-based handover, the electronic device 10 may instruct the basestation 120 which beam should be used in transmitting data to the basestation 120. For example, the basestation 120 may determine that beam 122 is the best beam for communications with the electronic device 10. However, the best beam may change before and/or during the RACH phase. Accordingly, the electronic device 10 may instruct the basestation 120 that a different beam, beam 124, is now the best beam for communications between the basestation 120 and the electronic device 10 since the best beam has changed.

Consequently, when a RACH-less handover occurs, the RACH phase is omitted, and the electronic device 10 is unable to directly instruct the basestation 120 as to which beam is the best. For example, in a RACH-less handover, the basestation 120 may rely on the beam 122 being the best beam from measurement reports (e.g., received from the basestation 112) even though the beam 124 is currently the best beam for communications between the electronic device 10 and the basestation 120. In other words, without a RACH phase the communications between the electronic device 10 and the basestation 120 may use an inferior beam rather than the best beam thereby possibly reducing efficiency of communications between the electronic device 10 and the basestation 120.

Figure 9:
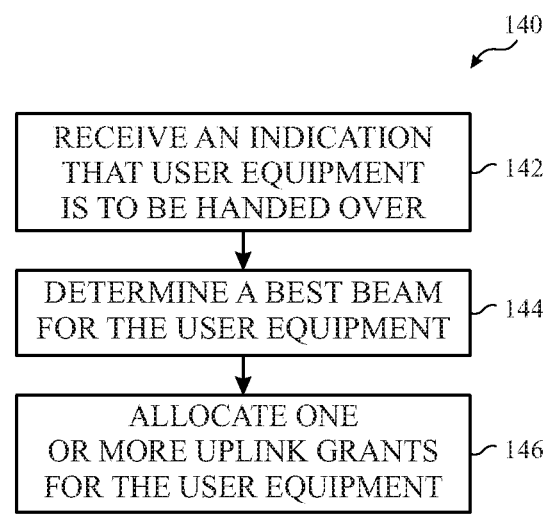
FIG. 9 is a flow diagram of a process of the cellular network of FIG. 8 allocating one or more uplink (UL) grants, in accordance with embodiments of the present disclosure.

One approach that may be used to account for beam management frameworks (e.g., 5G NR FR2) includes allocating additional UL grants to the UE when a handover between cells occurs. For instance, FIG. 9 illustrates a method 140 that may be implemented for the cell 128 to account for beam management. The method 140 may be performed using the basestation 120 and/or an associated computing device including a processor and memory similar to those discussed in relation to the electronic device 10. For example, a computing device may be used to control network actions for the cell and/or within the cell 128. For instance, in some embodiments, the computing device may be another instance of the computer 10D. The network (e.g., using the computing device) receives an indication that user equipment is to be handed over from the cell 118 to the cell 128 (block 142). For instance, the indication may indicate that a strength-of-signal (SoS) for communications between the electronic device 10 and the cell 118 has fallen below a threshold. Additionally or alternatively, the indication may indicate that a SoS for communication with the cell 128 is likely to exceed another threshold. For instance, this likelihood may be made based on a determined location of the electronic device 10 in relation to where the basestation 120 is located. Based on measurement reports, the basestation 112, the basestation 120, another basestation, the electronic device 10, and/or other processing within the network (e.g., central processing control center) determines a best beam (e.g., strongest beam) for communication between the electronic device 10 and the cell 128 (block 144). In some embodiments, the network may determine the best beam using a measurement report from the electronic device 10 or may determine the best beam by receiving an indication of the best beam from the electronic device 10.

The network allocates one or more UL grants for the electronic device 10 to communicate with the cell 128 (block 146). For instance, the basestation 112, the basestation 120, another basestation, and/or other processing within the network (e.g., central processing control center) may be used to allocate the one or more UL grants. Granting the one or more UL grants may include sending the UL grants to the electronic device 10 for communication with the cell 128 by sending the UL grants via the cell 118.

The one or more UL grants may be based at least in part on received measurements from the cell 118 from which the electronic device 10 is being handed off. The measurement report may be based on synchronization signal block (SSB) or channel state information reference signals (CSI-RS) that are used to estimate channel quality and report channel quality information. These measurement reports for communication between the cell 118 and the electronic device 10 may be used to determine the UL grants. Specifically, the one or more UL grants includes at least the best beam for communications between the electronic device 10 and the cell 128 based on measurements from the cell 118 that are transmitted to the electronic device 10 via the cell 118. For example, the network may grant the electronic device 10 three UL grants that correspond to first, second, and third best beams based on the previous measurement reports. The network may grant the multiple UL grants to the electronic device 10 to account for the possibility that the beam designated as the best beam due to the previous reports may have changed before the handover is completed. For instance, the best beam may have changed since the measurements. In other words, even though the electronic device 10 may know some information about the cell 128 before the handover but the situation may change before the handover is completed. The additionally granted UL grants makes it more likely that the electronic device 10 is granted a UL grant that corresponds to the best beam at and/or after the handover is completed. Some deployments of 5G NR FR2 networks may use multiple UL grants to ensure best beam fidelity during a handoff while others use only a single UL grant to prevent the electronic device 10 from consuming too many resources within the cellular network.

Figure 10:
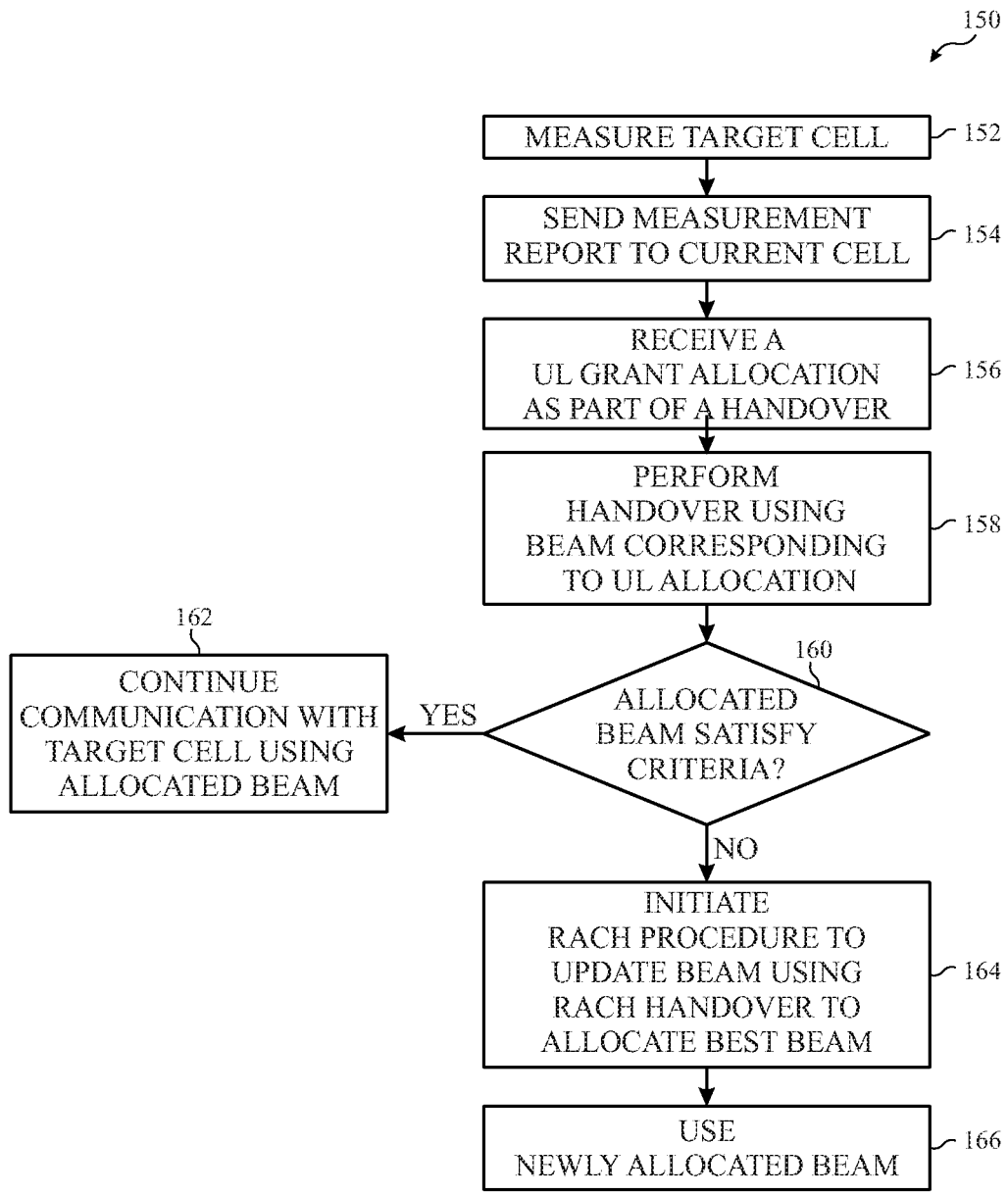
FIG. 10 is a flow diagram of a process of the electronic device performing a cell handover in the cellular network of FIG. 8 when the cellular network allocates one UL grant, in accordance with embodiments of the present disclosure.

The electronic device 10 responds to the number of UL grants according to the number of UL grants received. FIG. 10 is a flow diagram of a process 150 that may be used by the electronic device 10 in a handover where the electronic device 10 is allocated one UL grant as part of the handover. The electronic device 10 measures a target cell (block 152).

For instance, the electronic device 10 uses the antenna 20 to measure information about the cell 128 using SSB and/or CSI-RS. The electronic device 10 then sends a measurement report pertaining to the cell 128 via the cell 118 (block 154). The cell 128 allocates a UL grant corresponding to a best beam for a handover to the cell 128. The electronic device 10 receives the UL grant from the cell 118 (block 156). The electronic device 10 then stores the best reported beam. The electronic device then performs the handover using the beam corresponding to the allocated UL grant (block 158). Performing the handover includes, after handing over, measuring beams for the cell 128. The electronic device then compares the measured beams with the stored allocated beam to determine a current best beam. After the handover, the electronic device 10 determines whether the allocated beam satisfies criteria for the handover (block 160). In some embodiments, the criteria may be that the allocated beam is within a strength threshold (e.g., a number of decibels) of the current best beam. In some embodiments, the strength threshold may be determined according to standards, such as standards set by a radio performance and protocol aspects and radio resource management (RAN4 RRM) group. Additionally or alternatively, the threshold may be set to 0.0 dBs. In other words, the criteria may indicate that the allocated beam is to be used only when the allocated beam remains the best beam for communications between the electronic device 10 and the cell 128. Regardless of the value, the strength threshold value may be a parameter that is set for the electronic device 10 using a signal received by the electronic device 10 from the cellular network. Additionally or alternatively, the strength threshold may be defined by the electronic device 10.

Based on whether the connection with the cell 128 satisfies the criteria, the electronic device 10 determines how to proceed with further communication with the cell 128. If allocated beam satisfies the criteria by being the best beam or within a strength threshold of the best beam, the electronic device 10 continues communication with the target cell using the allocated beam that corresponds to the allocated UL grant (block 162). However, if the allocated beam does not satisfying the criteria by being outside a strength threshold of the best beam, the electronic device 10 initiates a RACH procedure to update the beam using a RACH handover to allocate the best beam (block 164). For instance, the electronic device 10 may send a message to the basestation 112 and/or the basestation 120 to initiate the RACH handover. The RACH handover may include the UE measuring a RACH downlink (DL), transmitting measurements pertaining to the RACH DL to the network, and receiving a new UL grant. After receiving a new UL grant, the electronic device uses the newly allocated beam to communicate with the cell 128 (block 166).

Figure 11:
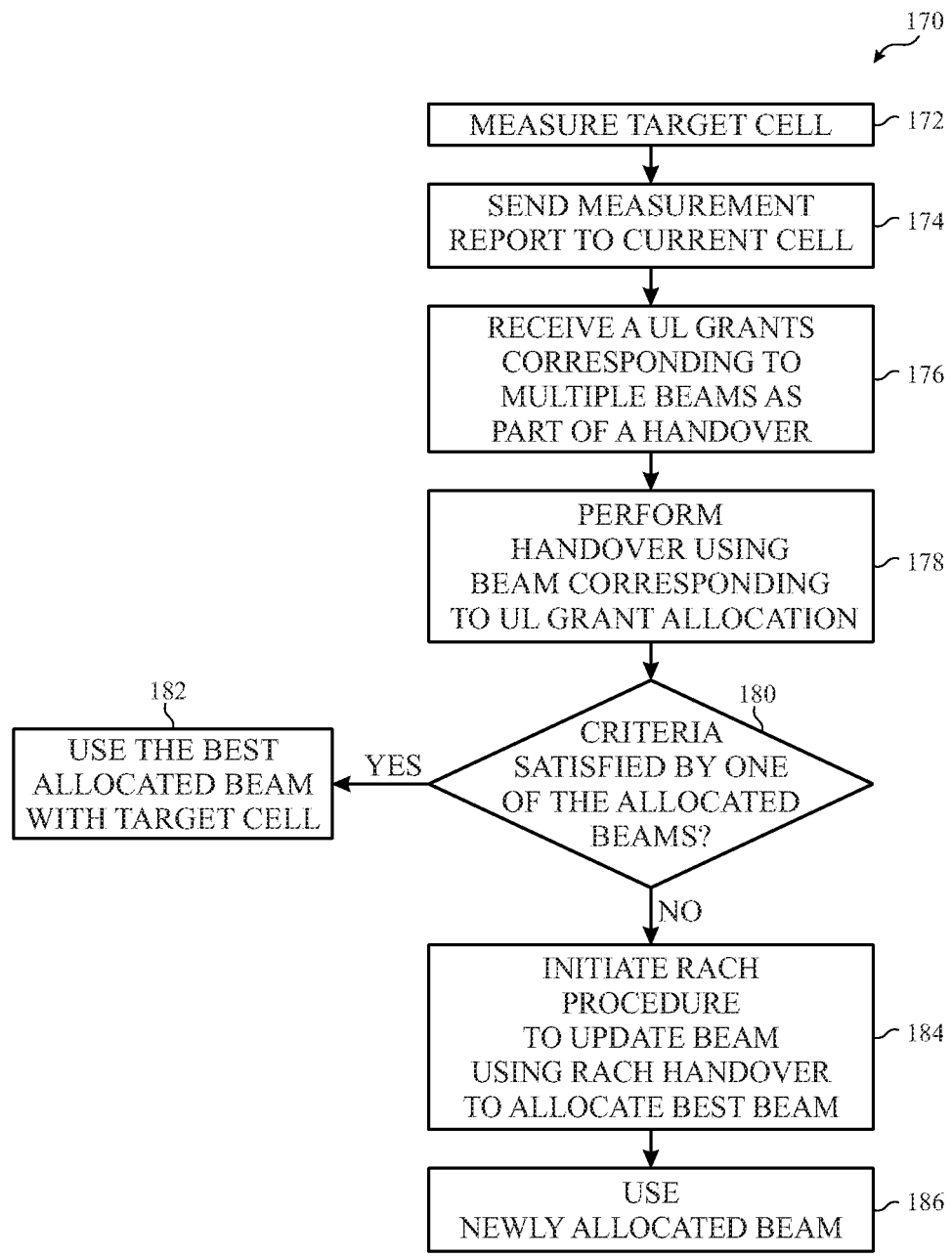
FIG. 11 is a flow diagram of a process of the electronic device performing a cell handover in the cellular network of FIG. 8 when the cellular network allocates multiple UL grants, in accordance with embodiments of the present disclosure.

FIG. 11 is a flow diagram of a process 170 that may be used by the electronic device 10 in a handover where the electronic device 10 is allocated two or more UL grants as part of the handover. The electronic device 10 measures a target cell (block 172). For instance, the electronic device 10 uses the antenna 20 to measure information about the cell 128 using SSB and/or CSI-RS. The electronic device 10 then sends a measurement report pertaining to beams of the cell 128 via the cell 118 (block 174). The cell 128 allocates two or more UL grants corresponding to the strongest two or more (e.g., 3) measured beams, including the best beam, for a handover to the cell 128. The electronic device 10 receives the UL grants from the cell 118 (block 176). The electronic device 10 then stores the best reported beams that are allocated. The electronic device then performs the handover using the best beam corresponding to the allocated UL grants (block 178). Performing the handover includes, after handing over, measuring beams for the cell 128. The electronic device then compares the measured beams with the stored allocated beams to determine a current best beam. After the handover, the electronic device 10 determines whether any of the allocated beam satisfy criteria for the handover (block 180). In some embodiments, the criteria may be that any of the allocated beams is within a strength threshold (e.g., a number of decibels) of the current best beam. As previously discussed, the strength threshold may be determined according to standards, such as standards set by a radio performance and protocol aspects and radio resource management (RAN4 RRM) group. Additionally or alternatively, the threshold may be set to 0.0 dBs. In other words, the criteria may indicate that one of the allocated beams is to be used only when the corresponding allocated beam is the current best beam for communications between the electronic device 10 and the cell 128. Regardless of the value, the value of the strength threshold may be a parameter that is set for the electronic device 10 using a signal received by the electronic device 10 from the cellular network. Additionally or alternatively, the strength threshold may be defined by the electronic device 10.

Based on whether the one of the allocated beams satisfies the criteria, the electronic device 10 determines how to proceed with further communication with the cell 128. If any of the allocated beams satisfies the criteria by being the best beam or within a strength threshold of the best beam, the electronic device 10 continues communication with the target cell 128 using the best allocated beam that corresponds to the allocated UL grants (block 182). For example, the UL grants may correspond to beams 122, 124, and 126. The beam 122 may be the original measured best beam before the handover, while the beam 124 is the best beam after handover. Since the best beam is allocated to the electronic device 10, the electronic device 10 may switch from using the beam 122 to using the beam 124 in communications with the cell 128.

As previously discussed, in situations where a non-zero threshold is utilized, the allocated beams may not be the best beam but may be used for communication with the cell 128 as long as the used allocated beam is within the strength threshold of the current best beam. For example, consider that the beams 122, 124, and 126 are allocated for the handover with the beam 122 being the best beam and an additional beam (not shown) is determined to be the best beam after handover. If the beams 122 and 124 are within the strength threshold of the additional beam, the beams 122 and 124 satisfy the criteria. The electronic device 10 then may use the beam 122 or the beam 124 for communication with the cell 128. If the beam 122 is now less strong at the electronic device 10 than the beam 124, the electronic device 10 may switch to using the beam 124 for communication with the cell 128. Otherwise, the electronic device 10 may continue to use the beam 122 for communication with the cell 128.

The electronic device 10 may switch between beams as long as the corresponding UL grants have not expired. In some embodiments, the UL grants may be prevented from expiring until an event has occurred to enable expiration of the unused UL grants. For example, the event may include a longer delay than a typical expiration during a handover and/or may include the electronic device 10 being handed over from the cell 128 to another cell. Additionally or alternatively, the event may include the electronic device 10 fully completing the handover and using one of the beams to initiate data transfer with the cell 128. Additionally or alternatively, the event may include the electronic device 10 sending a release signal that indicates that the unused allocated UL grants are no longer needed. Thus, unless the event has occurred, the electronic device 10 is free to change between the allocated beams.

However, if none of the allocated beams satisfies the criteria by being within the strength threshold of the best beam, the electronic device 10 initiates a RACH procedure to update the beam using a RACH handover to allocate the best beam (block 184). For instance, the electronic device 10 may send a message to the basestation 112 and/or the basestation 120 to initiate the RACH handover. The RACH handover may include the UE measuring a RACH downlink (DL), transmitting measurements pertaining to the RACH DL to the network, and receiving a new UL grant. After receiving a new UL grant, the electronic device uses the newly allocated beam to communicate with the cell 128 (block 186).

The specific embodiments described above have been shown by way of example, and it should be understood that these embodiments may be susceptible to various modifications and alternative forms. For example, the processes may be applied for embodiments having different numbers and/or locations for antennas, different groupings, and/or different network arrangements. Moreover, it should be further understood that foregoing processes may be performed by suitable computing devices (e.g., the electronic device 10) using tangible, non-transitory, and computer-readable medium (e.g., the memory 14 and/or the storage 16) storing instructions that when performed by one or more processors (e.g., processor(s) 12) are configured to cause the one or more processors to perform the foregoing processes. Furthermore, it should be further understood that the claims are not intended to be limited to the particular forms disclosed, but rather to cover all modifications, equivalents, and alternatives falling within the spirit and scope of this disclosure. For example, various embodiments of the processes may include combinations of blocks, rearrangement of blocks, and/or additional blocks that includes subject matter that is within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device; comprising:
   a network interface configured to interface with a cellular network;
   a memory storing instructions;
   a processor configured to execute the instructions, wherein, when the instructions are executed, are configured to cause the processor to:
   use the network interface to measure beams of a target cell of the cellular network, wherein the target cell is a cell of the cellular network to which the electronic device is to be handed over;
   send, via the network interface, a measurement report to a current cell of the cellular network;
   receive, via the network interface, an uplink (UL) grant, wherein the UL grant corresponds to a beam of the beams from the target cell of the cellular network to the electronic device, wherein the UL grant is received as part of a handover from the current cell to the target cell;
   perform the handover to the target cell using the beam without using a random access channel (RACH) procedure;
   after the handover, measure the beams of the target cell, including the beam, and determine whether the beam satisfies a criteria for a target cell best beam for communication between the electronic device and the target cell; and
   in response to determining that the beam does not satisfy the criteria, initiate a RACH-based handover to update to the target cell best beam for the communication between the electronic device and the target cell.

2. The electronic device of claim 1, wherein receiving the UL grant comprises receiving the UL grant from the current cell.

3. The electronic device of claim 2, wherein the UL grant is allocated by the target cell.

4. The electronic device of claim 1, wherein determining whether the beam satisfies the criteria, comprises measuring beams of the target cell via the network interface to determine whether a new best beam exists.

5. The electronic device of claim 4, wherein, when no new best beam exists, the instructions are configured to cause the processor to continue using the beam to communicate with the target cell via the network interface when the criteria has been satisfied by the beam, wherein the beam is the best beam.

6. The electronic device of claim 4, wherein, when the new best beam exists, the instructions are configured to cause the processor to:
   determine whether the new best beam corresponds to one of a plurality of UL grants, wherein the plurality of UL grants comprises the UL grant; and
   when the new best beam corresponds to one of the plurality of UL grants, switch communications to the new best beam from the beam for communications with the target cell via the network interface, wherein the criteria is satisfied when the new best beam corresponds to the one of the plurality of UL grants, and the criteria is not satisfied when the new best beam does not correspond to the one of the plurality of UL grants.

7. The electronic device of claim 4, wherein the instructions are configured to cause the processor to:
   determine whether the beam is within a strength threshold of the new best beam; and
   when the beam is within the strength threshold, identify that the criteria has been satisfied and utilize the beam to communicate with the target cell via the network interface.

8. The electronic device of claim 7, wherein the beam comprises an allocated best beam that was the best beam at the time of allocation of the beam.

9. The electronic device of claim 7, wherein the strength threshold is defined by the cellular network in a signal received by the electronic device via the network interface.

10. The electronic device of claim 7, wherein the strength threshold is defined by the electronic device.

11. The electronic device of claim 7, wherein the strength threshold is set to a value indicated by a radio performance and protocol and radio resource management standard.

12. The electronic device of claim 1, wherein the instructions are configured to cause the processor, via the network interface, to measure beams of the target cell before the handover.

13. The electronic device of claim 12, wherein the instructions are configured to cause the processor to send the measurement report, via the network interface, to the current cell regarding the measurement of the beams of the target cell.

14. The electronic device of claim 1, wherein the beam comprises an allocated best beam that was the best beam at the time of allocation of the plurality of beams.

15. A method, comprising:
using a network interface of an electronic device, measuring beams of a target cell of a cellular network, wherein the target cell is a cell of the cellular network to which the electronic device is to be handed over;
sending, via the network interface, a measurement report to a current cell of the cellular network;
receiving, via the current cell and the network interface, an uplink (UL) grant corresponding to a beam of the beams of the target cell to be used in communication between the electronic device and the target cell;
performing handover to the target cell using the beam without using a random access channel (RACH) procedure;
after the handover, measuring the beams of the target cell, wherein the beams include the beam;
determining whether the beam is within a strength threshold of a target cell best beam; and
when the beam is not within the strength threshold of the target cell best beam, initiating a RACH-based handover to update to the target cell best beam for communications between the electronic device and the target cell.

16. The method of claim 15, wherein measuring the target cell comprises using a synchronization signal block (SSB) or a channel state information reference signal (CSI-RS).

17. The method of claim 15, comprising, after the handover, measuring the target cell to obtain the target cell best beam.

18. The method of claim 15, wherein the strength threshold comprises a number of decibels.

19. The method of claim 15, wherein the strength threshold comprises 0.0 decibels to cause the initiating of the RACH-based handover unless the beam remains the target cell best beam.

* * * * *